(12) United States Patent
Katzengruber et al.

(10) Patent No.: US 12,360,017 B2
(45) Date of Patent: Jul. 15, 2025

(54) MICROTOME SYSTEM AND CORRESPONDING METHOD

(71) Applicant: LEICA MIKROSYSTEME GMBH, Vienna (AT)

(72) Inventors: Matthias Katzengruber, Vienna (AT); Robert Ranner, Vienna (AT); Paul Wurzinger, Vienna (AT)

(73) Assignee: LEICA MIKROSYSTEME GMBH, Vienna (AT)

( * ) Notice: Subject to any disclaimer, the term of this patent is extended or adjusted under 35 U.S.C. 154(b) by 288 days.

(21) Appl. No.: 18/299,759

(22) Filed: Apr. 13, 2023

(65) Prior Publication Data
US 2023/0341298 A1 Oct. 26, 2023

(30) Foreign Application Priority Data
Apr. 26, 2022 (EP) .................... 22169921

(51) Int. Cl.
*G01N 1/06* (2006.01)
*G01N 1/28* (2006.01)

(52) U.S. Cl.
CPC .............. *G01N 1/06* (2013.01); *G01N 1/286* (2013.01); *G01N 2001/061* (2013.01); *G01N 2001/065* (2013.01); *G01N 2001/068* (2013.01); *G01N 2001/2873* (2013.01)

(58) Field of Classification Search
CPC .... G01N 1/06; G01N 1/286; G01N 2001/061; G01N 2001/065; G01N 2001/068; G01N 2001/2873
See application file for complete search history.

(56) References Cited

U.S. PATENT DOCUMENTS

| | | | |
|---|---|---|---|
| 4,021,118 A | 5/1977 | Soderkvist et al. | |
| 7,104,666 B2 * | 9/2006 | Lihl | ........... G01N 1/06 83/915.5 |
| 10,012,567 B2 * | 7/2018 | Bui | ........ B26D 7/015 |
| 10,054,518 B2 | 8/2018 | Hess et al. | |
| 2004/0035275 A1 | 2/2004 | Lihl et al. | |

(Continued)

FOREIGN PATENT DOCUMENTS

| | | |
|---|---|---|
| EP | 0098818 A1 | 1/1984 |
| JP | S50 129981 U | 10/1975 |

(Continued)

*Primary Examiner* — Omar Flores Sanchez
(74) *Attorney, Agent, or Firm* — LEYDIG, VOIT & MAYER, LTD.

(57) ABSTRACT

A microtome system for cutting sections from a specimen includes a knife including a knife edge configured to cut a section from the specimen, a knife holder, a specimen holder, an illumination, a first actor, a detector, and a controller. The knife holder and specimen holder are configured to be relatively moveable in a cutting direction. The first actor is configured to cause a rotation of the knife holder or specimen holder about an axis. The illumination is configured to illuminate a gap between a front face of the specimen and the knife edge to generate a light gap. The detector is configured to detect a geometric feature of the light gap. The controller is configured to automatically align, or provide indications to manually align, the knife edge with the front face, by controlling the first actor depending on the detected geometric feature.

14 Claims, 9 Drawing Sheets

(56) References Cited

U.S. PATENT DOCUMENTS

| | | | | |
|---|---|---|---|---|
| 2013/0140459 A1* | 6/2013 | Galloway | ............ | H01J 37/244 |
| | | | | 250/310 |
| 2017/0336300 A1 | 11/2017 | Luttenberger et al. | | |
| 2018/0310829 A1* | 11/2018 | Frangioni | ............... | A61B 34/20 |
| 2019/0103249 A1* | 4/2019 | Biberger | ................. | H01J 37/28 |
| 2021/0263055 A1* | 8/2021 | Mitra | .................... | G06T 7/521 |
| 2022/0364960 A1* | 11/2022 | Smith | ...................... | G01N 1/06 |
| 2023/0298855 A1* | 9/2023 | Effting | ................... | G01N 1/286 |
| | | | | 250/307 |

FOREIGN PATENT DOCUMENTS

| JP | S51126888 A | 11/1976 |
|---|---|---|
| JP | 2008076251 A | 4/2008 |
| JP | 2010066006 A | 3/2010 |

\* cited by examiner

A - A

B - B

MICROTOME SYSTEM AND CORRESPONDING METHOD

CROSS REFERENCE TO RELATED APPLICATIONS

This application claims benefit to European Patent Application No. EP 22169921.8, filed on Apr. 26, 2022, which is hereby incorporated by reference herein.

FIELD

The present invention relates to a microtome system for cutting sections from a specimen, to a corresponding method, and to a computer program.

BACKGROUND

Microtomes or microtome systems can be used for cutting sections from a specimen like a biological or histological sample. Such microtome systems typically comprise a knife and a sample, which are guided relative to and along each other in order to cut thin slices from the sample. In order to generate even cuts or slices, the knife typically has to be aligned with the specimen or a specimen holder.

SUMMARY

In an embodiment, the present disclosure provides a microtome system for cutting sections from a specimen. The microtome system includes a knife including a knife edge configured to cut a section from the specimen, a knife holder holding the knife, a specimen holder configured to hold the specimen, an illumination, a first actor, a detector, and a controller. The knife holder and the specimen holder are configured to be moveable relative to one another in a cutting direction. The knife holder or the specimen holder is mounted rotatably about a first axis. The first actor is configured to cause a rotation of the knife holder or the specimen holder about the first axis. The illumination is configured to illuminate a gap between a front face of the specimen when held by the specimen holder and the knife edge, in order to generate a light gap. The detector is configured to detect at least one geometric feature of the light gap. The controller is configured to: a) automatically align the knife edge with the front face of the specimen by controlling the first actor depending on the detected at least one geometric feature of the light gap, and/or b) provide indications to a user, depending on the detected at least one geometric feature of the light gap, on how to manually control the first actor in order to align the knife edge with the front face of the specimen.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
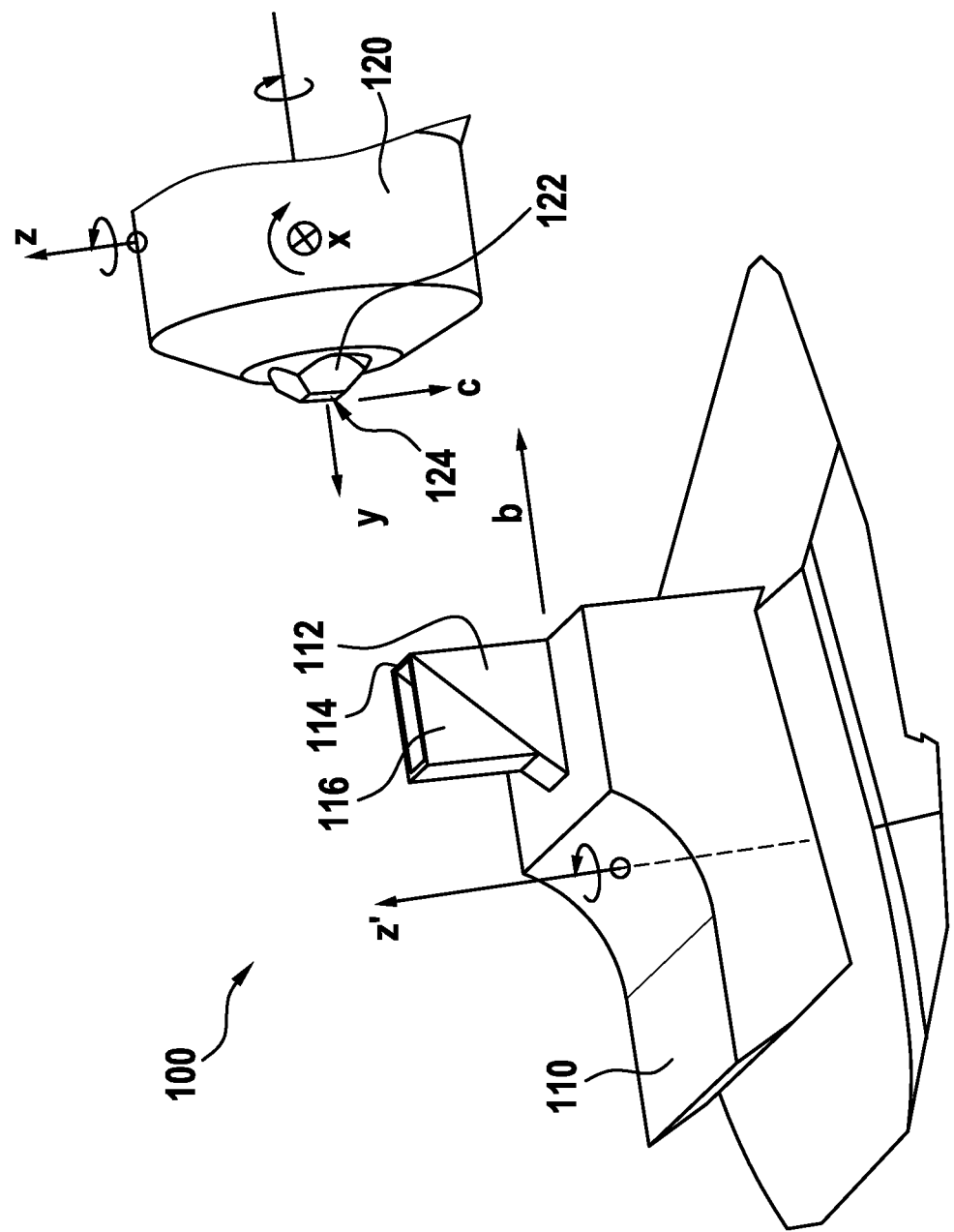
FIG. 1 schematically shows a microtome system according to an embodiment of the invention.

In view of the situation described above, there is a need for improvement in microtome systems. An embodiment of the invention relates to a microtome system for cutting sections from a specimen. For example, such microtome system can comprise an ultra-microtome (microtome for cutting very thin or ultra-thin slices from a specimen). In an embodiment, the microtome system comprises: a knife having a knife edge configured to cut a section from the specimen, a knife holder holding said knife, a specimen holder configured to hold the specimen, an illumination (or light source), a first actor, a detector, and a controller. The knife holder and the specimen holder are configured to be moveable relative to one another in a cutting direction. In addition, the knife holder and the specimen holder are, in a preferred embodiment, configured to be moveable relative to one another in one or more further directions like a feed direction, as will be explained later. The knife holder or the specimen holder is mounted rotatably about a first axis. Particularly, the cutting direction is parallel to the first axis. In a preferred embodiment, each of the knife holder and the specimen holder can be mounted to be rotatably about one or more axes, as will be described later. The first actor is configured to cause a rotation of the knife holder or specimen holder (whichever is rotatable about the first axis) about the first axis.

The illumination can be configured to illuminate a gap between a front face of the specimen when held by the specimen holder and the knife edge. In this way, a light gap is generated; the measures of the light gap might be different from those of the gap, depending on the way of how the light is reflected between knife and front face (this will be explained in more detail later). The detector can be configured to detect at least one geometric feature of the light gap. Such geometric feature can comprise, for example, a length, a width or a parallelism of the light gap or borders of it, or a variability as will be described in more detail later. The controller can be configured to a) automatically align the knife edge with the front face of the specimen by controlling the first actor depending on the detected at least one geometric feature of the light gap and/or b) provide indications (e.g., guiding lines) to a user depending on the detected at least one geometric feature of the light gap on how to manually control the first actor in order to align the knife edge with the front face of the specimen.

As mentioned above, the knife or the knife edge of a microtome system and the specimen (or specimen holder) may need to be aligned in order to generate even and good cuts or slices from the specimen. In general, such aligning can be performed manually; for example, the light gap mentioned can be monitored visually by the user during adjustment operations like turning different knobs or hand wheels for rotating the knife or the specimen holder. Such manual adjustment, however, may require sufficient experience of the user. With wrong settings, the knife, which often comprises diamond, might be damaged, for example. Also, the sample might be damaged.

The inventors have recognized that using at least one geometric feature of the light gap detected by a detector can be used to automate the aligning procedure. Such automation can include fully automatic aligning for example, as described for alternative a), and it can also include partial automatic aligning by automatically providing helpful indications or instructions to the user, as described for alternative b). Depending on the alternative used, the first actor can be motorized and/or manually operated. The detected least one geometric feature can be analysed, for example, by means of image or video processing. Such automation also allows unexperienced users to easily and efficiently align the knife or knife edge of the microtome system with the sample. Wrong settings, which might lead to damages, can be avoided or, at least, be reduced.

In an embodiment of the invention, the controller is configured to control the first actor for arranging the knife edge parallel to the front face of the specimen such that the at least one geometric feature of the detected light gap comprises a constant width along a light gap length. This allows setting the knife edge being parallel to the front face of the specimen.

According to a further embodiment of the invention, the microtome system further comprises a second actor, and the knife holder or the specimen holder is mounted rotatably about a second axis. This can, preferably, correspond to a tilt of the sample holder relative to the knife holder. The second actor is configured to cause a rotation of the knife holder or specimen holder about the second axis, and the controller is configured to control the second actor such that the front face of the specimen is arranged parallel to the cutting direction. In particular, this can be done such that the at least one geometric feature of the detected light gap comprises a dimension that remains constant during relative movement in the cutting direction between the knife edge and the specimen when held by the specimen holder. This allows setting the knife and specimen holder for generating slices having equal thickness along the cutting direction.

According to a further embodiment of the invention, the microtome system further comprises a third actor. The knife holder or the specimen holder is mounted rotatably about a third axis, wherein a feed direction of the specimen holder with respect to the knife holder is parallel to the third axis. The third actor is configured to cause a rotation of the knife holder or specimen holder about the third axis, and the controller is configured to control the third actor such that the upper edge and/or the lower edge of the front face of the specimen is arranged parallel to the knife edge. In particular, this can be done such that, during relative movement in the cutting direction between the knife edge and the specimen when held by the specimen holder, the at least one geometric feature of the detected light gap comprises a dimension that remains constant along the length of the light gap over a predetermined upper region up to the upper edge of the front face of the specimen and then decreases evenly along the length of the light gap and/or over a predetermined lower region down to the lower edge of the front face of the specimen and then decreases evenly along the length of the light gap. This allows setting the knife and specimen holder for cutting to start at the entire edge of the front face at the same time, for example.

According to a further embodiment of the invention, the detector comprises a digital camera configured to image the light gap, i.e., to acquire an image of the light gap. In particular, such image of the light gap comprises the adjacent knife edge and/or at least a part of the front face of the specimen opposed to the knife edge. In this way, the borders or edges of the light gap required for image analysis, for example, can be analysed sufficiently.

According to a further embodiment of the invention, a value of the at least one geometric feature of the light gap is detected by the camera based on a plurality of images acquired at the same relative positions between the knife holder and the sample holder. For example, the intensities of the plurality of images (or of each of the pixels of the images) can be averaged. In this way, the precision of the detected geometric feature can be improved. In particular, a precision that is higher than the actual resolution of the camera provides, can be achieved in this way. Noise in such images can even be of advantage in this case. Note that this way of how to determine a value of the at least one geometric feature can be applied to each of the geometric features mentioned (and for each of the rotations mentioned).

According to a further embodiment of the invention, the detector is configured to detect a plurality of values for the at least one geometric feature of the light gap for a plurality of different relative positions between the sample holder and knife holder. The controller can be configured to, based on the plurality of values of the detected features, a) automatically align the knife edge with the front face of the specimen, and/or b) provide the indications to the user. For example, the values for each of the relative positions can be interpolated. In this way, also a value between two detected values (from the interpolation) can be acquired. In this way, a precision that is higher than the actual resolution of the camera provides, can be achieved in this way. Note that this way of how to determine a value of the at least one geometric feature can be applied to each of the geometric features mentioned (and for each of the rotations mentioned).

Another embodiment of the invention relates to a method for aligning a knife edge of a knife with a front face of a specimen for cutting sections from the specimen. The knife is held by a knife holder, and the specimen is held by a specimen holder. The knife holder or the specimen holder is mounted rotatably about a first axis, and a first actor is configured to cause a rotation of the knife holder or specimen holder about the first axis. Said method comprises: illuminating, by an illumination, a gap between a front face of the specimen and the knife edge, in order to generate a light gap; detecting, by a detector, at least one geometric feature of the light gap, and a) automatically aligning the knife edge with the front face of the specimen by controlling, with a controller, the first actor depending on the detected at least one geometric feature of the light gap, and/or b) providing indications to a user depending on the detected at least one geometric feature of the light gap on how to manually control the first actor in order to align the knife edge with the front face of the specimen.

Another embodiment of the invention relates a computer program with a program code for performing the following steps, when the computer program is run on a processor: receiving, from a detector, at least one geometric feature of a light gap, wherein the light gap has been generated, by an illumination, illuminating a gap between a front face of a specimen and a knife edge; and a) generating instructions for controlling a first actor for automatically aligning the knife edge with the front face of the specimen depending on the detected at least one geometric feature of the light gap, and/or b) generating and providing indications to a user depending on the detected at least one geometric feature of the light gap on how to manually control the first actor in order to align the knife edge with the front face of the specimen.

With respect to advantages and further embodiments of the method and the computer program, it is referred to the above description of embodiments of the microtome system and its features and advantages, which apply here correspondingly.

Further advantages and embodiments of the invention will become apparent from the description and the appended figures.

It should be noted that the previously mentioned features and the features to be further described in the following are usable not only in the respectively indicated combination, but also in further combinations or taken alone, without departing from the scope of the present invention.

FIG. 1 schematically illustrates a microtome system 100 according to an embodiment of the invention, in a perspective view. The microtome system 100 is, preferably, an ultra-microtome system or comprises an ultra-microtome. The microtome system 100 comprises a knife holder 110 and a specimen holder 120. Note that a typical microtome comprises further components like a housing and the like.

The knife holder 110 holds a knife 112; the knife 112 has a knife edge 114 at the top right of the knife 112. In addition, a reception box 116 can be arranged at or on the knife 112, for example. The specimen holder 120 is configured to hold a specimen 122. For example, such specimen 122 can have the form of a block, which can be mounted into the specimen holder 120 such that a front face 124 of the specimen 122 is oriented towards the knife 112.

The operating mechanism of such microtome system 100 is, in general, that the specimen 122 is moved along a cutting direction c relative to the knife edged 114 when the specimen is properly aligned with the knife edge. The knife edge 114 is configured to cut a section (or slice) from the specimen 122. A section that has been cut off the specimen 122 can be collected in the collection box 116, for example. In order to provide such movement, the knife holder 110 and the specimen holder 120 are configured to be moveable relative to one another in the cutting direction c. Basically, either or both of the knife holder 110 and the specimen holder 120 can be configured to be movable along cutting direction c. In an embodiment, (only) specimen holder 120 is configured to be movable in cutting direction c (in both ways, up and down). In addition, the knife holder 110 and the specimen holder 120 can be configured to be movable relative to one another in feed direction b, in order to bring the knife edge 114 in contact with the specimen 122 and, in particular, to feed the specimen 122 after a section or slice has been cut from the specimen 122.

In an embodiment, the knife holder 110 and, thus, the knife 112, is configured to be movable in the feed direction b, i.e., towards (and also away from) the specimen 112 or the specimen holder 120. Basically, however, also the specimen holder 120 might be configured to be movable in (or against) the feed direction b towards the knife 112.

As mentioned earlier, in order to generate proper and precise sections cut from the specimen, the knife 112 or knife edge 114 and the specimen 122 or specimen holder 120 have to be aligned prior to cutting.

This can require that the knife holder 110 or the specimen holder 120 is to be mounted rotatably about at least one axis.

In FIG. 1, four axes are shown for illustration purposes: a first axis z', a second axis x, a third axis y, and a further axis z. Rotating the knife holder 110 and/or the specimen holder 120 around one or more of these axis allows aligning the knife edge 114 with the front face 124 of the specimen 122 as will be described in more detail later.

As can be seen from FIG. 1, in general, the specimen holder 120 might be configured to be rotatable around each of three different axes x, y, and z, for example. Similarly, the knife holder 110 might be configured to be rotatable around each of three different axes, for example, from which only axis z' is shown (similar, axes x' and y' might be used). Note that the axes shown are oriented according to a Cartesian coordinate system, as is typical for such microtome systems; however, this is for illustration purposes only and other ways of defining such axes are possible. Rotating the knife holder 110 and the specimen holder 120 around three different axes each, allows many degrees of freedom for aligning the knife edge 114 and the specimen front face 124. Nevertheless, three different axes in total for both, the knife holder 110 and the specimen holder 120 can be sufficient for providing alignment in sufficiently many ways.

In an embodiment, the knife holder 110 is mounted rotatably around the first axis z', wherein the first axis z' is parallel to the cutting direction c. The specimen holder 120 is mounted rotatably around the second axis x and the third axis y. The third axis y is parallel to the feed direction b. As can be seen from FIG. 1, an equivalent to the knife holder 110 being mounted rotatably around the first axis z', would be the specimen holder 120 being mounted rotatably around the axis z. In both alternatives, the knife edge 114 can be rotated relative to the specimen 122 or its front face 124 in the same or an equivalent way. Similarly, the knife holder 110 might be rotatable around further axis x' and/or y', which would be equivalent to the specimen holder being rotatable around axis x and/or y. Which component of knife holder and specimen holder is to be rotatable around which axes might be chosen depending on a preferred way of implementation in the specific microtome system.

Further, it is noted that, basically, only one or two axes around which one of knife holder and specimen holder are rotatable, can be sufficient to align the knife edge 114 and the specimen front face 124. Note that actors can be provided to the knife holder 110 and/or specimen holder 120 in order to facilitate the required rotation around the respective axis. This will be described later.

Figure 2A:
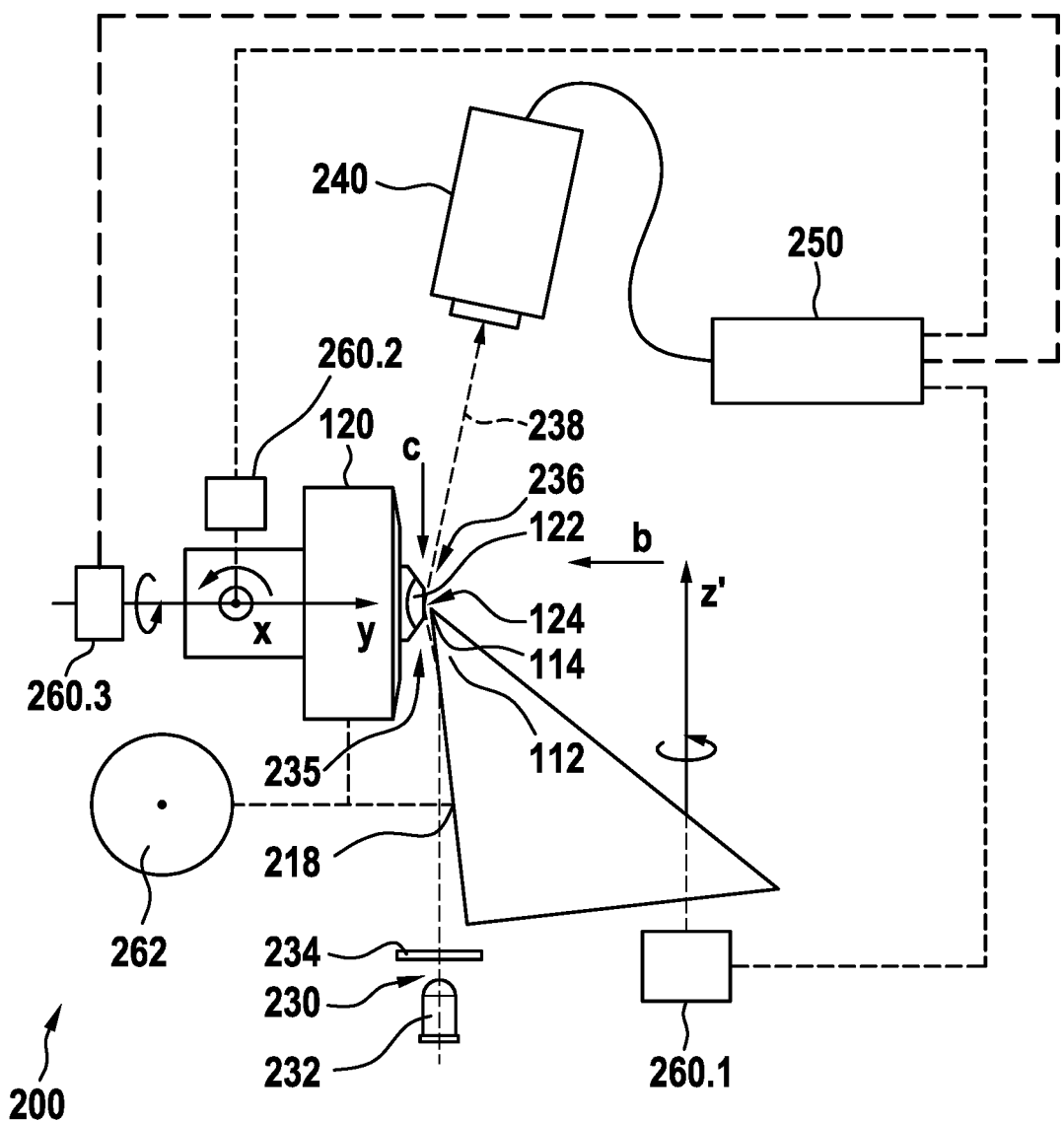
FIG. 2A schematically shows a microtome system according to a further embodiment of the invention.

FIG. 2A schematically illustrates a microtome system 200 according to a further embodiment of the invention. Microtome system 200 basically corresponds to microtome system 100 of FIG. 1. In contrast to FIG. 1, the microtome system is shown in a sectional view and rotated (positions of knife holder and specimen holder are exchanged). The axes and directions shown in FIG. 1 correspond to the ones shown in FIG. 2A. Note that some components of microtome 100 of FIG. 1 are not shown in FIG. 2A, some are shown (with identical reference numerals) and some further components are shown.

In particular, the microtome system 200 comprises, besides the knife holder 110 with knife 112 and the specimen holder 120 with specimen 122, an illumination 230, a detector 240, and a controller 250. The illumination 230 comprises, in an embodiment, a LED or other light source 232 and a diffusion element or filter 234 in order to provide even illumination by means of the light source 232. In an embodiment, the detector 240 can comprise a camera.

The illumination 230 is arranged such that a light beam 238, which is emitted from the illumination 230 (or the light source 232), is directed to the region where the front face 124 of the specimen 122 and the knife edge 114 are arranged. Light passing the gap 235 between the front face 124 of the specimen 122 and the knife edge 114 reaches the detector 240. In this way, a light gap 236 is produced, which is or can be detected by the detector 240. Depending on the current alignment or arrangement of the knife 112 and the specimen 122, the light of the light beam 238 might be reflected on a side surface 218 of the knife 112 and/or on the front face 124 of the specimen 122.

Figure 2B:
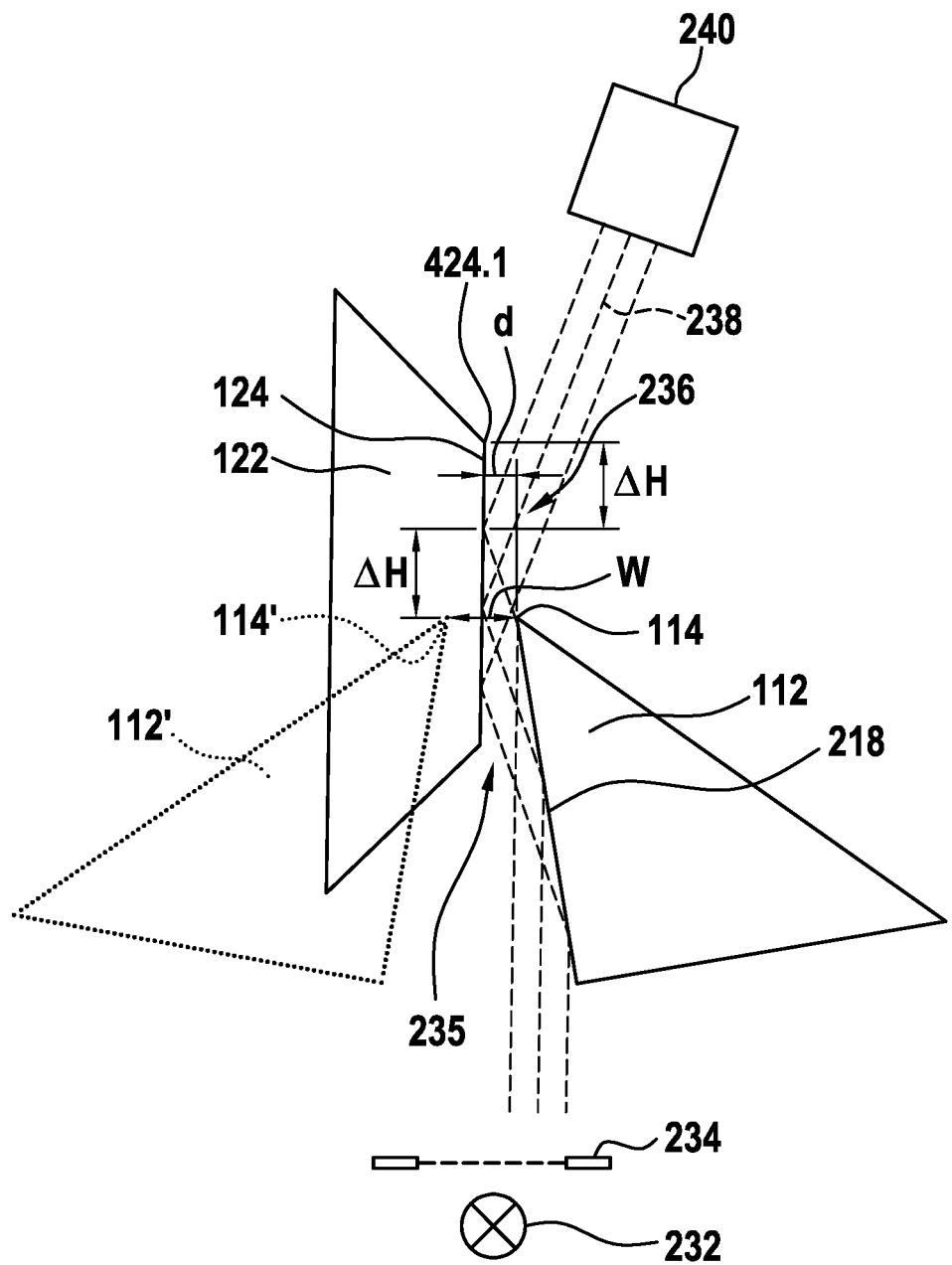
FIG. 2B schematically shows a way of how to generate a light gap.

FIG. 2B illustrates a way of how the light gap 236 can be produced, in an embodiment, in more detail. Some components from FIG. 2A are illustrated enlarged in FIG. 2B. Light emitted from the light source 232 and passing the diffusion element 234 is reflected at the side surface 218 of the knife 112 and then at the front face 124 of the specimen 122. Light of the light beam 238 then reaches the detector 240. Thus, the detector detects, as a border of the light gap 236, a mirrored knife edge 114' of a mirrored knife 112', which is generated by the knife edge 114 and the knife 112 mirroring in the front face 124. A width W of the light gap 236 is, thus, formed by the distance of the knife edge 114 and the mirrored knife edge 114'. The width W is approximately twice of the width d of the actual gap 236 between the front face 124 and the knife edge 114, depending on an angle of the slight inclination of light beam 238 between the front face 124 and the detector 240.

It is noted that light passing the gap 235 without reflection at either the side surface 218 or the front face 114 will not contribute to the light gap to be detected in this example.

The controller 250 can be electrically and/or communicatively coupled to the detector 240 in order to receive data or information detected or acquired by the detector 240. In an embodiment, the controller 250 can also be electrically and/or communicatively coupled to the illumination 230.

In an embodiment, the microtome system 200 further comprises a first actor 260.1, a second actor 260.2, and a third actor 260.3. Note that, if only one or two axes are used about which the knife holder 110 and/or the specimen holder 120 are rotatably mounted, one or two actors would be sufficient.

The first actor 260.1 is configured to cause a rotation of the knife holder 110 about the first axis z'. Note that in FIG. 2A, the knife holder 110 is not shown, however, it is clear from FIG. 1 and FIG. 2A that a rotation of the knife holder results in a corresponding rotation of the knife 112 around axis z'. The second actor 260.1 is configured to cause a rotation of the specimen holder 120 about the second axis x; such rotation corresponds to a tilt of the specimen holder 120 and, thus, of the specimen 122. The third actor 260.3 is configured to cause a rotation of the specimen holder 120 about the third axis y. Each of the first, second and third actor 260.1, 260.2, 260.3 can be motorized. The controller 250 can be electrically and/or communicatively coupled to each of the first, second and third actor 260.1, 260.2, 260.3 in order to operate them and, thus, to cause the mentioned rotation about the respective axis.

In an embodiment, one, two or all three of the first, second and third actor 260.1, 260.2, 260.3 can also be un-motorized but be configured to be actuated or operated manually, for example, like a hand wheel, in order to cause the mentioned rotation. Also, one or more of the first, second and third actor 260.1, 260.2, 260.3 can be motorized but configured for manual operation, for example, such that a user has to actuate an operating element like a switch in order to actuate the actuator.

In an embodiment, the microtome system 200 comprises a hand wheel or actuation wheel 262. The hand wheel 262 is configured to cause a cutting movement such that the specimen holder 120 moves in the cutting direction c, up and down, in order to cut sections from the specimen. The hand wheel 262 can also be configured to cause a feed movement (of the knife holder 110, for example) in the feed direction b. Both movements, cutting movement and feed movement, can be coupled such that efficient cutting of several slices is possible. The hand wheel 262 can be motorized and/or configured for manual operation. In case the hand wheel is motorized, an automated cutting movement is possible, such that the hand wheel might be used only for additional and/or correctional movements.

In addition, a side movement in a direction of second axis x might be possible in order to move the specimen, after a section or slice has been cut, in order to cut another section or slice next to the first one. The hand wheel 262 can also be configured to provide such side movement. Also, such side movement could be implemented in another way, for example by an additional (motorized) hand wheel.

Figure 3:
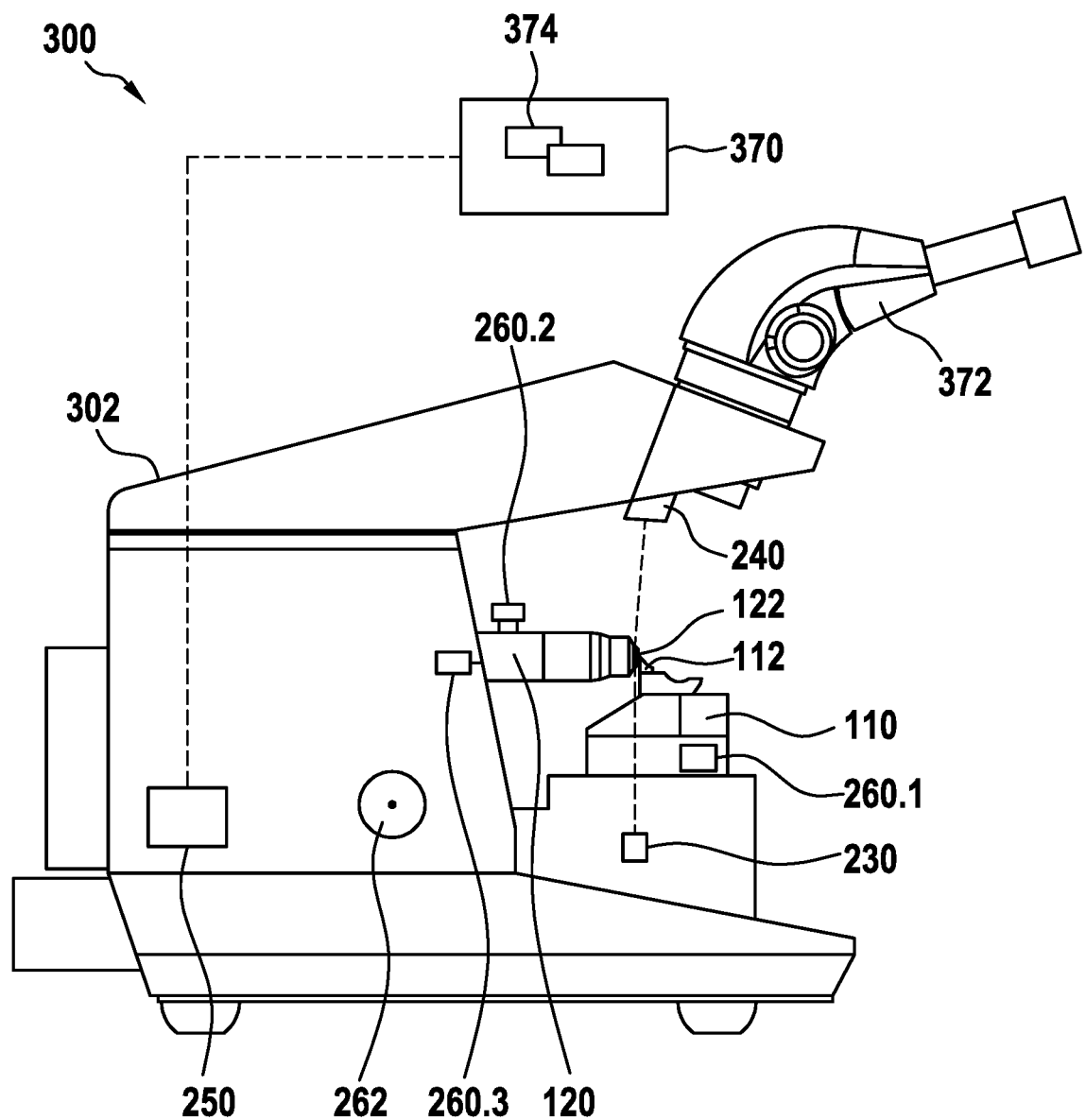
FIG. 3 schematically shows a microtome system according to a further embodiment of the invention.

FIG. 3 schematically illustrates a microtome system 300 according to a further embodiment of the invention. Microtome system 300 basically corresponds to microtome system 100 of FIG. 1 and microtome system 200 of FIGS. 2A, 2B. In addition to FIGS. 1 and 2A, 2B, a housing 302 of the microtome system 300 is shown, in which housing 302 the required components are arranged. It is noted that some components of microtome 100 of FIG. 1 and of microtome system 200 of FIGS. 2A, 2B. are not shown in FIG. 3, some are shown (with identical reference numerals) and some further components are shown.

Microtome system 300 further comprises, in an embodiment, a microscope 372, which is arranged at the housing 302 and is configured such that a user can look at (and inspect) the region of the specimen 122 and the knife 112 (with knife edge 114, not shown in FIG. 3). For example, a user might inspect the cutting movement and/or the quality of the knife edge 114, in this way. The light gap, generated by the illumination 230 by illuminating the (physical) gap between the specimen 122 (or its front face 124) and the knife 112 (or its knife edge 114) is detected by the detector 240. This might require appropriate arrangement and/or orientation of the detector 240.

Also, the microscope 372 might be arranged and/or oriented such that this light gap is visible by means of the microscope 372. Further, the microscope 372 does not need to be an optical microscope but can use the detector 240 in order to provide an image of the region on an integrated display. In an embodiment, the detector 240 can also be integrated into the microscope 372.

Microtome system 300 further comprises, in an embodiment, a display 370, on which information about the cutting process and/or indications 374 for the alignment of the knife edge 114 with the front face 124 of the specimen 122 can be displayed to the user. In an embodiment, the microtome system 300 is also configured to render a user interface or graphical user interface, in particular, by using the display 370. In addition, input devices like switches, buttons, a keyboard and a computer mouse might be used. Also, display 370 can comprise a touch screen.

FIGS. 4A, 4B, 4C and 4D illustrate the light gap 236 and the respective relative positions of front face 124 and knife edge 114 for explanation of embodiments of the invention. In addition, first axis z', second axis x and third axis y as well as cutting direction c are shown in these FIGS. The orientations of these axes and direction are in accordance with the previous FIGS.

Figure 4A:
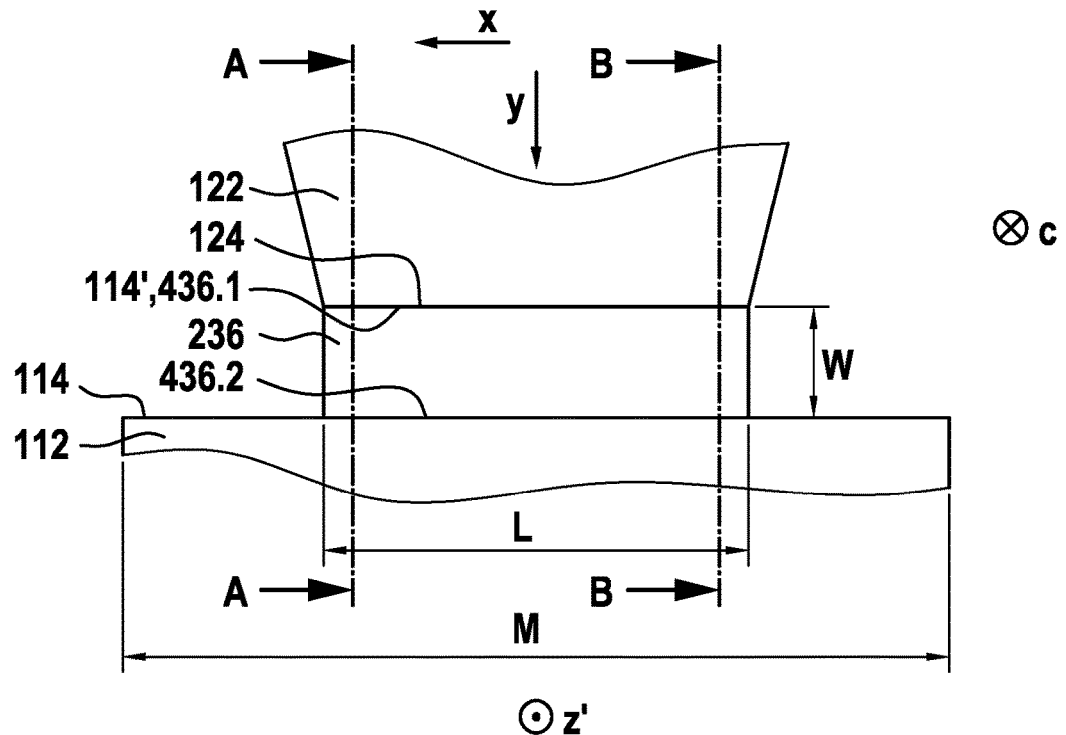
FIG. 4A, 4B, 4C, 4D and 4E schematically show light gaps for explanation of embodiments of the invention.

In FIG. 4A, the light gap 236 is illustrated in a top view like it is seen by the microscope 372 of FIG. 3 for example, or from detector 240, for example. This view is approximately along the cutting direction c, in particular along light beam 238 as illustrated in FIGS. 2A, 2B. As mentioned, the light beam 238 can be slightly inclined versus the cutting direction c. The light gap 236, in an embodiment, has a length or light gap length L. The length L is, for example, defined along the knife edge 114. The length L, typically, corresponds to the length of the front face 124 in this direction. In addition, the light gap has a width W. The width W, for example, corresponds to the distance of the knife edge 114 from the mirrored knife edge 114' (i.e., the reflection of knife edge 114 at the front face 124) as illustrated in FIG. 2A. As mentioned for FIG. 2B, the width W is approximately twice the distance d between the knife edge 114 and the front face 124. It is noted that the mirrored knife edge 114' appears at the front face 124.

In order to cut sections or slices from the specimen 122, which are of constant or even thickness, the knife edge 114 shall be aligned with the front face 124 such that the knife edge 114 is parallel to the front face 124. As can be seen from FIG. 4A, the knife edge 114 being parallel to the front face 124 corresponds to or results in the width W having the same or a constant value along the entire length L. If a value of the width W was smaller, for example, on the left end of length L (in FIG. 4A) than on the right end of length L, knife edge 114 would not be parallel to the front face 124.

In that a geometric feature like the width W along the length L is detected with the detector and analyzed, this allows for aligning the knife edged 114 with the front face 124. The first actor can be controlled so as to rotate the knife holder and, thus, the knife 112 and the knife edge 114, around the first axis z' until the width W detected is constant along the length L. From FIG. 4A it is clear that rotation the knife edge 114 about the first axis z' results in changing the width W at every position along the length L.

It is noted that this constant width W along the length L is an example for a geometric feature of the detected light gap 236, which can be used to align the knife edge 114 with the front face 124. Another possible geometric feature might be an angle between the long edges 436.1, 436.2 of the light gap 236, i.e., the edge 436.2 at or corresponding to the knife edge 114 and the edge 436.1 corresponding to the mirrored knife edge 114'. As mentioned, the mirrored knife edge 114' and, thus, the edge 436.1 appear on the front face 124. If such an angle is zero, these two edges are parallel. Consequently, the knife edge 114 and the front face 124 are parallel to each other. Another possible geometric feature might be a variability of the width W; such variability should then be zero, i.e., the width should not vary after final alignment.

While in an embodiment, such aligning can be performed automatically, in another embodiment, indications might be generated from the geometric feature and provided to the user, for example, on the display shown in FIG. 3. If a value of the width W was smaller, for example, on the left end of length L (in FIG. 4A) than on the right end of length L, such indication might include the instruction for the user to operate the first actor such that the knife holder 110 (and, thus, the knife 112 and the knife edge 114) is rotated about the first axis z' in a certain direction (clockwise, for example). In addition, such instruction could include a measure of how much or how far the knife holder has to be rotated about the first axis z'.

In an embodiment, the cutting process can include cutting sections or slices from the specimen 122 with different positions of the specimen 122 relative to the knife in a side direction by moving the knife 112 in a direction parallel to the third axis x by a certain amount after each or after a certain number of cuts. For every new or new certain number of sections to be cut, the knife 112 can then be moved in such side movement along the direction of axis x by a certain distance (e.g., 1 mm or the like)

In this case, it is of advantage if the knife 112 is aligned such that the width W is constant over the entire length M of the knife edge 114 but not only along the length of the front face 124, which corresponds to the length L of the light gap. It is noted that, in practice, the entire length M of the knife edge 114 is a multiple of the length of the front face 124 or the length L (other than in the example of FIG. 4A). This might require moving the knife along the direction of axis x in order to acquire values for the width W at the required positions.

Figure 4B:
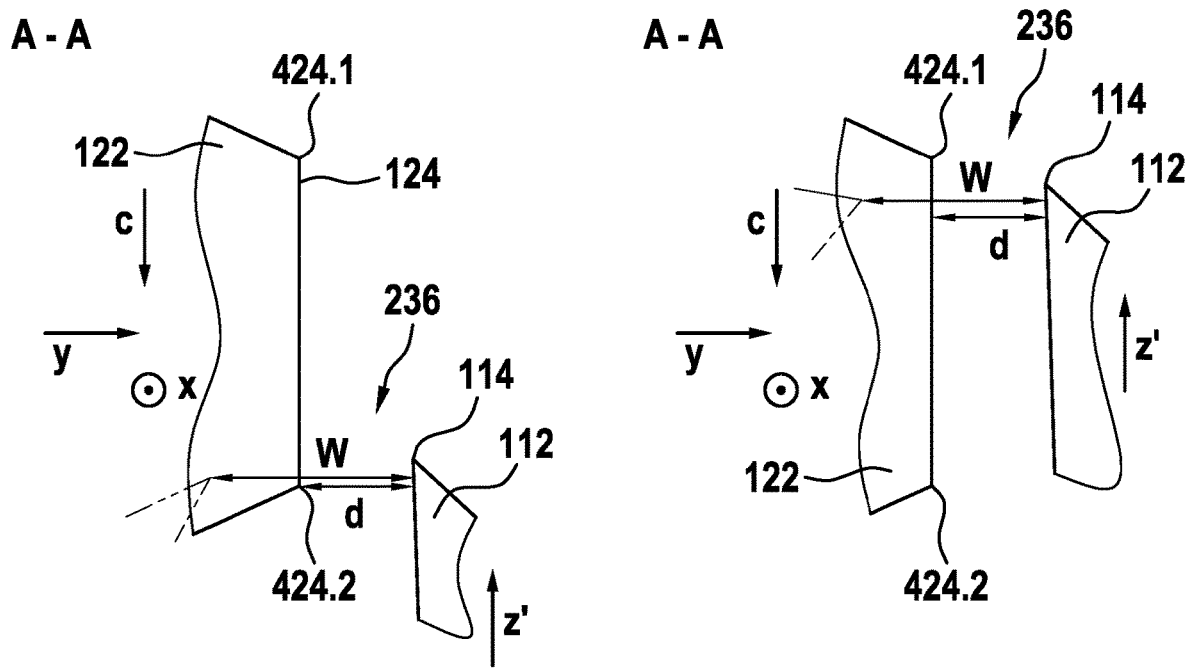

In FIG. 4B, the light gap 236 is illustrated in a side view like along axis x. There are two different situations shown, one on the left side and one on the right side. Both situations can correspond to a view along A-A as indicated in FIG. 4A. In both situations, the specimen 122 and the knife 112 with knife edge 114 are shown. An upper edge 424.1 and a lower edge 424.2 of the front face 124 of the specimen 122 are indicated.

On the left side, the relative position between the specimen 122 and the knife 112 (and, thus, between the specimen holder 120 and the knife holder 110) is such that almost the entire front face 124 is located above the knife edge 114, viewed in the cutting direction c. The width W of the light gap 236 is indicated, in addition to the distance d of the (physical) gap (see FIG. 2A for how the width W can be determined). On the right side, the relative position between the specimen 122 and the knife 112 (and, thus, between the specimen holder 120 and the knife holder 110) is such that almost the entire front face 124 is located below the knife edge 114, viewed in the cutting direction c. The width W of the light gap and the distance d of the (physical) gap are indicated again.

In order to cut sections or slices from the specimen 122, which are of constant or even thickness, the knife edge 114 shall be aligned with the front face 124 such that the front face 124 of the specimen 122 is arranged parallel to the cutting direction c. As can be seen from FIG. 4B, the front face 124 being parallel to the cutting direction c corresponds to or results in the width W having the same or a constant value during relative movement in the cutting direction c between the knife edge 114 and the specimen 122 when held by the specimen holder 120. This corresponds to the width W having the same or a constant value for different relative positions between the knife edge 114 and the specimen 122 along the cutting direction c. Two of these different positions are illustrated with the two situations in FIG. 4B. Note that this also results in the distance d having the same or a constant value during relative movement in the cutting direction c between the knife edge 114 and the specimen 122 when held by the specimen holder 120.

Such relative movement in the cutting direction c between the knife edge 114 and the specimen 122 when held by the specimen holder 120 and, thus, different relative positions at which a value for the width W can be detected or acquired, can be achieved by means of operating the hand wheel 262 mentioned above, for example. This might be manually or automatically, for example.

If a value of the width W was smaller, for example, near the lower edge 424.2 (see left side of FIG. 4B) than near the upper edge 424.1 (see right side of FIG. 4B), the front face 124 would not be parallel to the cutting direction c. In that a geometric feature like the width W during relative movement in the cutting direction c between the knife edge 114 and the specimen 122 when held by the specimen holder 120 is detected with the detector and analyzed, this allows for aligning the front face 124 to be parallel with the cutting direction c. This corresponds to the width W having the same or a constant value for different relative positions between the knife edge 114 and the specimen 122 along the cutting direction c.

The second actor can be controlled so as to rotate the specimen holder 120 and, thus, the specimen 122 with its front face 124, around the second axis x until the width W detected is constant for different relative positions along the cutting direction c. From FIG. 4B it is clear that rotation of the specimen holder 120 (and, thus, of the front face 124) about the second axis x results in changing the width W at every relative position between the front face 124 and the knife edge 114 along the cutting direction.

It is noted that this constant width W during relative movement in the cutting direction c is an example for a geometric feature of the detected light gap 236, which can be used to align the front face 124 to be parallel with the cutting direction c. Another possible geometric feature might be a variability of the width W; such variability should then be zero, i.e., the width should not vary after final alignment.

While in an embodiment, such aligning can be performed automatically, in another embodiment, indications might be generated from the geometric feature and provided to the user, for example, on the display shown in FIG. 3. If a value of the width W was smaller, for example, in the situation shown on the left side of FIG. 4B than in the situation shown on the right side, such indication might include the instruction for the user to operate the second actor such that the specimen holder 120 (and, thus, the specimen 122 and its front face 124) is rotated about the second axis x in a certain direction (clockwise, for example). In addition, such instruction could include a measure of how much or how far the specimen holder has to be rotated about the second axis x.

It is noted that, typically, it does not matter where along the light gap length L (see FIG. 4A) the values for the width W for different relative positions between the front face 124 and the knife edge 114 are acquired. In particular, if the previous aligning step, described with respect to FIG. 4A, the rotation about the first axis z', has been made, the values for the width W for a certain relative position are equal along the length L anyway.

Figure 4C:
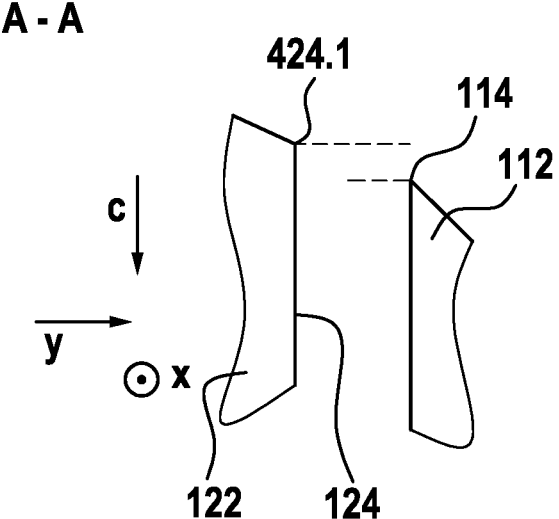
Figure 4C:
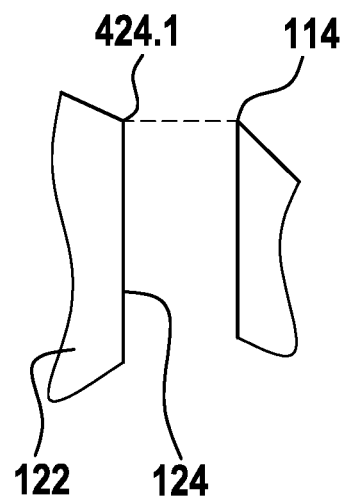

In FIG. 4C, the light gap 236 is illustrated in a side view like along axis x. There are two different relative positions between the upper edge 424.1 of the front face 124 and the knife edge 114 shown, one on the left side and one on the right side.

On the left side, the relative position between the specimen 122 and the knife edge 114 is such that the upper edge 424.1 is located above the knife edge 114, viewed in the cutting direction c. On the right side, the relative position between the specimen 122 and the knife edge 114 is such that the upper edge 424.1 is located approximately at or slightly below the knife edge 114, viewed in the cutting direction c.

The light gap as detected by the detector is visible as such (with the form of a slit or rectangle with sharp edges) only if the entire upper edge 424.1 of the front face 124 is located sufficiently above the knife edge 114, viewed in cutting direction c. This situation is illustrated in FIG. 2B. This means that, with an upper edge 424.1 being parallel to the knife edge 114 and the specimen 122 moving down in the cutting direction c, the light gap will become narrower and will disappear, when the upper edge 424.1 has moved sufficiently below the knife edge 114. This is similar with the lower edge 424.2 of the front face 124 being or moving up sufficiently close to or above the knife edge 114, viewed in cutting direction c.

If the upper edge 424.1 is not parallel to the knife edge 114, a situation occurs, in which the relative position on the left side and the relative position on the right side of FIG. 4C are present at the same time. For example, the relative position on the left side can correspond to a view along A-A as indicated in FIG. 4A, and the relative position on the right side can correspond to a view along B-B as indicated in FIG. 4A. In other words, the upper edge 424.1 (and, thus, the specimen 122) is rotated about the third axis y.

Figure 4D:
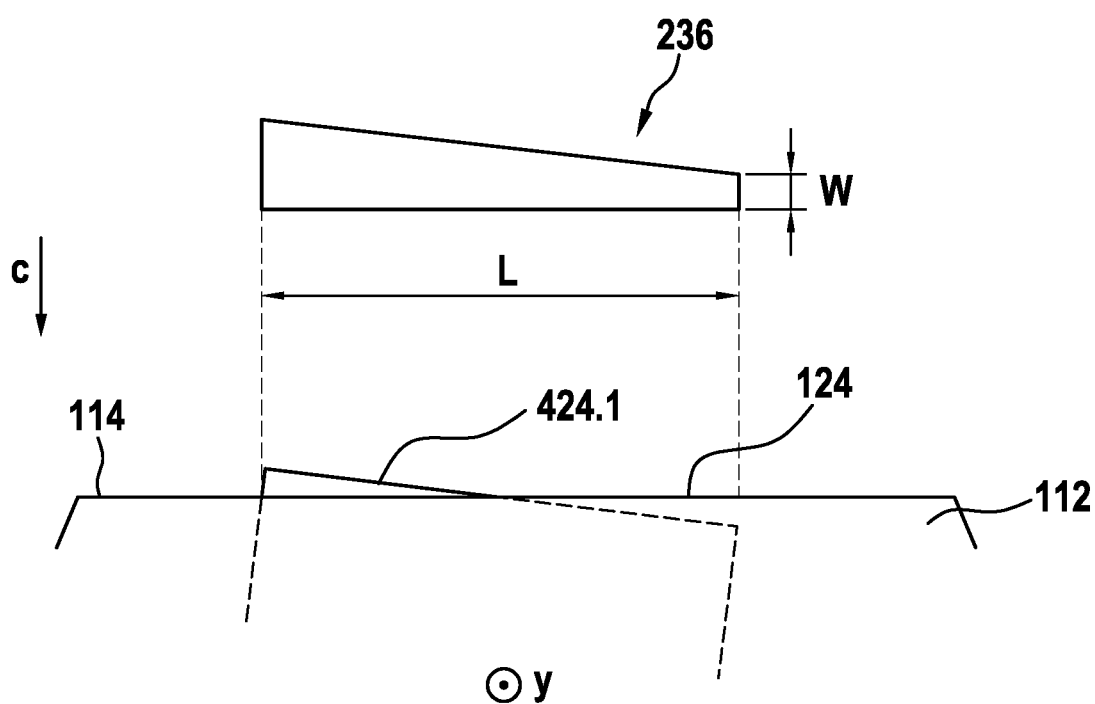

With the situation illustrated in FIG. 4C, when the specimen 122 is moved down in the cutting direction c, the light gap, will become narrower (with respect to width W) only where the upper edge 424.1 reaches or moves below the knife edge 114. The narrowing of the light gap starts at the right side according to FIG. 4B, moving on to the left side. This results in the actual, light gap becoming smaller and smaller until it disappears. The light gap might be look like wedge shaped during such movement. This is illustrated in FIG. 4D with the knife edge 114 and the front face 124 on the lower side, viewed along axis y, and the wedge shaped light gap 236 on the upper side (the light gap as viewed along the cutting direction c).

In other words, the width W of the light gap changes (decreases) along the length L with moving the specimen 122 down in the cutting direction. The further the specimen is moved down, the further the decreased width moves towards the end of the length L. This change occurs over a certain distance in the cutting direction, where this distance depends on how far the upper edge 424.1 is rotated out of the position where it is parallel to the knife edge. Afterwards, the light gap becomes wedge shaped, becoming smaller and finally disappears.

Figure 4E:
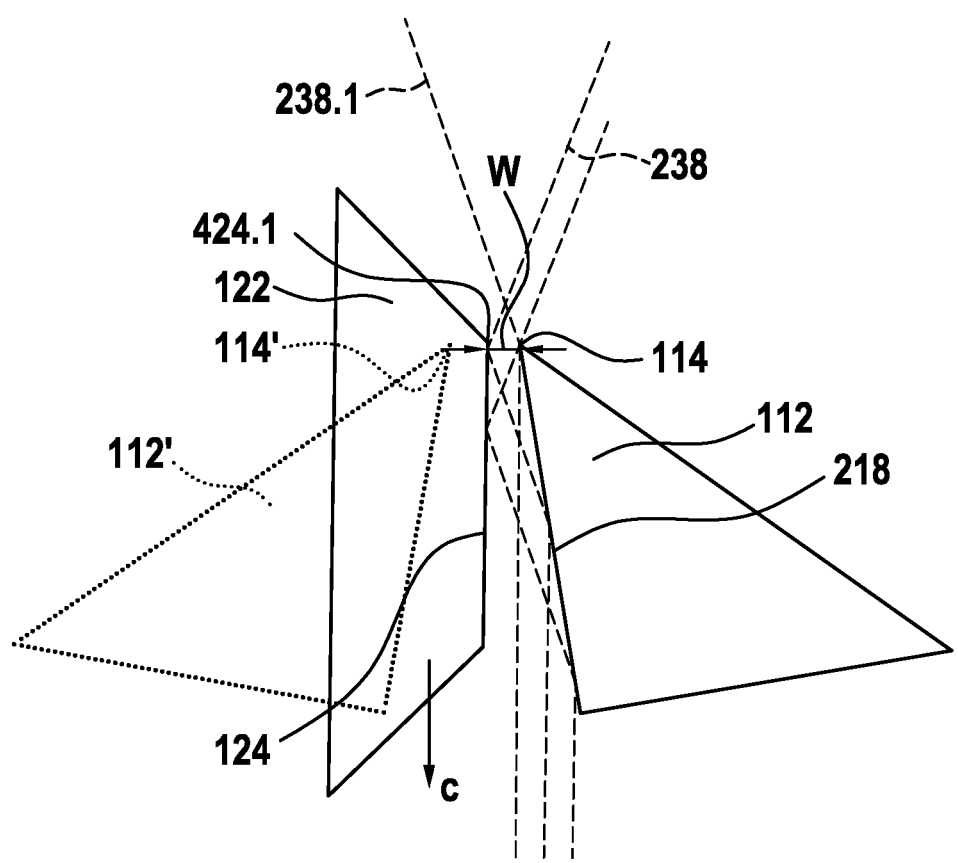

FIG. 4E illustrates how the width W of the light becomes narrower with the upper edge 424.1 moving down to and then below the knife edge 114. The situation illustrated in FIG. 4E is similar to that of FIG. 2B, however, with the upper edge 424.1 located approximately at or slightly below the knife edge 114, viewed in the cutting direction c (see also right side of FIG. 4C). The light ray 238.1 shown in FIG. 4E that is reflected at the top end of side surface 218, is not reflected at the front face 214 anymore, because the upper edge 424 is too low. Thus, this light ray cannot contribute to the light gap anymore, resulting in a narrower light gap.

In order to cut sections or slices from the specimen 122 with cutting starting at the entire edge of the front face 124 at the same time, the knife edge 114 shall be aligned with the front face 124 such that the upper edge 424.1 and/or the lower edge 424.2 of the front face 124 is arranged parallel to the knife edge 114. It is noted that the upper edge 424.1 and the lower edge 424.2 of the front face 124 are, typically, parallel to each other. In other words, the situation illustrated in FIG. 4D shall not occur after alignment.

This can be achieved by controlling the third actor 260.3 that causes the specimen holder 120 and, thus, also the upper edge 424.1 and/or the lower edge 424.2 of the front face 124, to rotate about the third axis y. When, during relative movement in the cutting direction c between the knife edge 114 and the specimen 122, the width W remains constant along the length L of the light gap 236 over a predetermined upper region up to the upper edge 424.1 of the front face 124 and then—for example, when a certain distance ΔH between the knife edge 114 and the upper edge 424.1 is reached—decreases evenly along the length L of the light gap 236 the upper edge 424.1 and/or the lower edge 424.2 of the front face 124 is at least almost parallel to the knife edge 114. Such distance ΔH is illustrated in FIG. 2B: when the upper edge 424.1, with the specimen 122 moving down, is only ΔH away from the knife edge 114, the leftmost light ray will not anymore be reflected at the front face 124—thus, the width W becomes narrower. For the upper region up to the upper edge, until the distance ΔH away from the upper edge 424.1 is reached, the width W is constant.

It is noted the three alignment procedures—i) knife edge 114 to be parallel with the front face 124 of the specimen 122, ii) front face 124 of the specimen 122 parallel to the cutting direction c, iii) upper edge 424.) and/or lower edge 424.2 of the front face 124 of the specimen 122 parallel to the knife edge 114—using the respective first, second and third actor can also be performed individually, in an arbitrary sequence and also only one or two of them can be used. For example, if one or two of such alignment procedures are not able to done or are not necessary for any reason.

Figure 5:
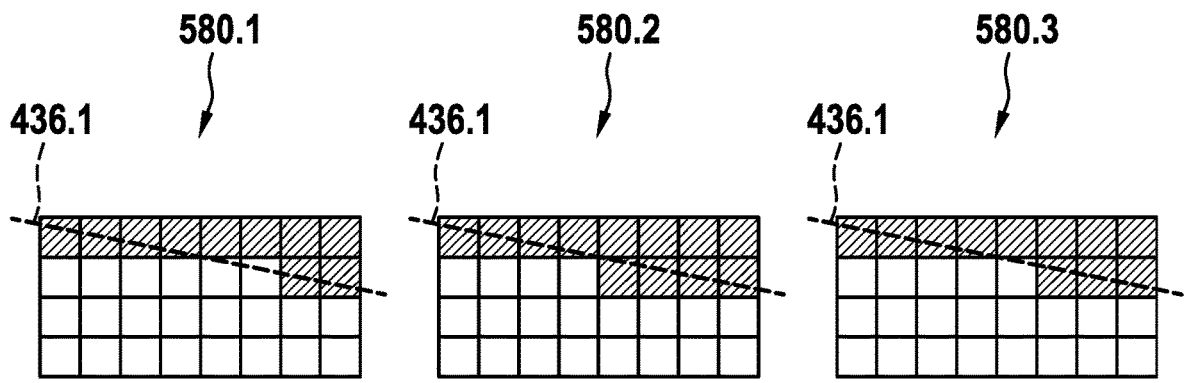
FIG. 5 schematically shows images of an upper edge of a light gap.

FIG. 5 illustrates images of an upper edge of a light gap, acquired by the detector 240 or the camera thereof. A detector, typically, has multiple pixels arranged in a matrix array. This results in each pixel of the detector being exposed to high or low light intensity when acquiring an image of the light gap. A typical size of such pixels rated with the magnification of the camera (or detector) optics is in the range of 1 μm. This means that dimensions of the light gap can be determined, from a single image acquired with such detector, only with a precision of down to 1 μm.

A typical thickness of sections or slices to be cut off the specimen by means of the microtome system, however, often shall be less than 1 μm. Thus, the precision with which the knife edge 114 and the front face 124 have to be aligned, should be better than 1 μm. For example, an angle between knife edge 114 and the front face 124 should be less than 0.1° (what can be considered sufficiently parallel). This can be achieved with a typical detector as mentioned above by acquiring multiple images at the same relative positions between the knife holder 110 and the sample holder 120.

By means of example, three images 580.1, 580.2, 580.3 are shown in FIG. 5, each illustrating the edge of the light gap. For example, this might be the edge 436.1 illustrated in FIG. 4A. Individual pixels 580 are indicated, which were exposed with either high or low light intensity (dark shaded). Due to the low precision, individual pixel might exhibit different intensities for different images having been acquired. This is also due to noise. Note that, typically, also other grades of intensity, not only high and low, will appear. A straight line or edge (edge vector) can be determined from each image. Then, an average edge (or edge vector) can be determined from these multiple edges (or edge vectors). By averaging the edges over the number of images (three images in this example), a more precise value can be achieved. This results in that a very precise alignment of the knife edge 114 and the front face 124 can be achieved, even in a sub-pixel resolution.

It is noted that this way of improving accuracy can be used in every one of the steps for aligning mentioned above, i.e., for an alignment based on a rotation about the first, the second and the third axis. For example, every time or at least sometimes when a geometric feature or dimension of the light gap has to be detected or determined for a certain relative position, multiple images can be acquired instead of only one image.

Figure 6A:
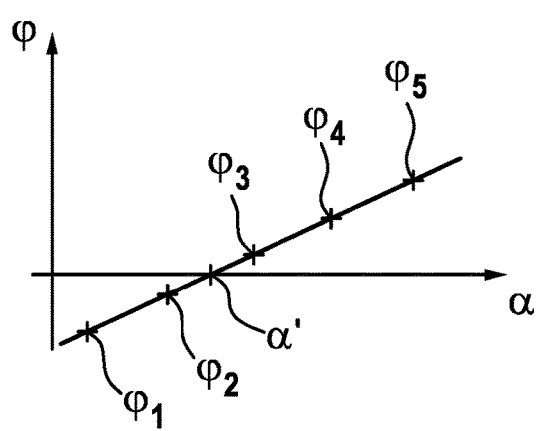
FIGS. 6A and 6B schematically show two diagrams with values for a geometric feature of the light gap for a plurality of different relative positions.
Figure 6B:
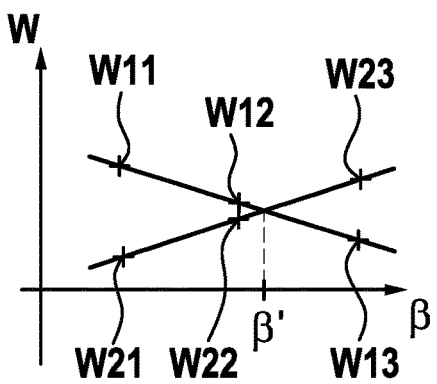

FIGS. 6A and 6B illustrate, in diagrams, values for the at least one geometric feature of the light gap for a plurality of different relative positions between the sample holder and knife holder.

In FIG. 6A, values φ1, φ2, φ3, φ4, φ5 for an angle γ between the two edges 436.1 and 436.2 of the light gap (see FIG. 4A), which is related to the width W along the length L are shown versus an angle α. The angle α corresponds to an angle of rotation of the knife holder about the first axis z'. Note that a reference value for the angle α can set appropriately. In the example shown, the five values φ1, φ2, φ3, φ4, φ5 for an angle φ are either below or above zero. As has been described with respect to FIG. 4A, however, the angle φ should be zero; this corresponds to the edges 436.1 and 436.2 of the light gap being parallel.

Due to detector resolution issues, for example, no further values between the ones shown can be achieved. By means of interpolation of the values 636.1, 636.2, 636.3, 636.4, 636.5 however, see the line in FIG. 6A, a value α' for the angle α can be determined, which corresponds to the angle φ being zero. Such value α' can then be set by the first actor such that the knife edge 114 is aligned with and, in particular, is parallel to the front face 124 of the specimen 122. Accuracy can be improved in this way.

In FIG. 6B, values for the width W of the light gap (see FIG. 4B) are shown versus an angle β. The angle β corresponds to an angle of rotation of the specimen holder about the second axis x (tilt angle). As mentioned above with respect to FIG. 4B, a relative movement in the cutting direction c between the knife edge 114 and the specimen 122 can be performed in order to arrange the front face 124 of the specimen 122 parallel to the cutting direction c. Thus, during one move of the specimen along the knife edge 114, several values for the width W can be acquired at different relative positions between the sample holder 120 and knife holder 110. For example, a first value can be acquired at a relative position where the knife edge 114 is near the upper edge 424.1 of the front face 124 (see FIG. 4B, right side), and second value can be acquired at a relative position where the knife edge 114 is near the lower edge 424.2 of the front face 124 (see FIG. 4B, left side).

Such values can be acquired for different settings of the angle β. In FIG. 6B, by means of example, three of such first values W11, W12, W13, and three of such second values W21, W22, W23 obtained for three settings of β are shown. In addition, an interpolation line for the first and second values, respectively, is added. This shows that, for example, with increasing the value of angle β, the width W near the upper edge decreases while the width W near the lower edge increases. As mentioned above, the width W shall be equal for both relative positons. The appropriate value of angle β, where this is achieved, is where both lines are crossing, i.e., value β'. Such value β'can then be set by the second actor such that the knife edge 114 is aligned with the front face 124 of the specimen 122 such that the front face 124 is parallel to the cutting direction c. Accuracy can be improved in this way.

It is noted that each of both ways of improving accuracy, multiple images per relative position and a plurality of values for different relative positions, helps increasing accuracy. Also, both ways can be combined to even further increase accuracy.

Figure 7:
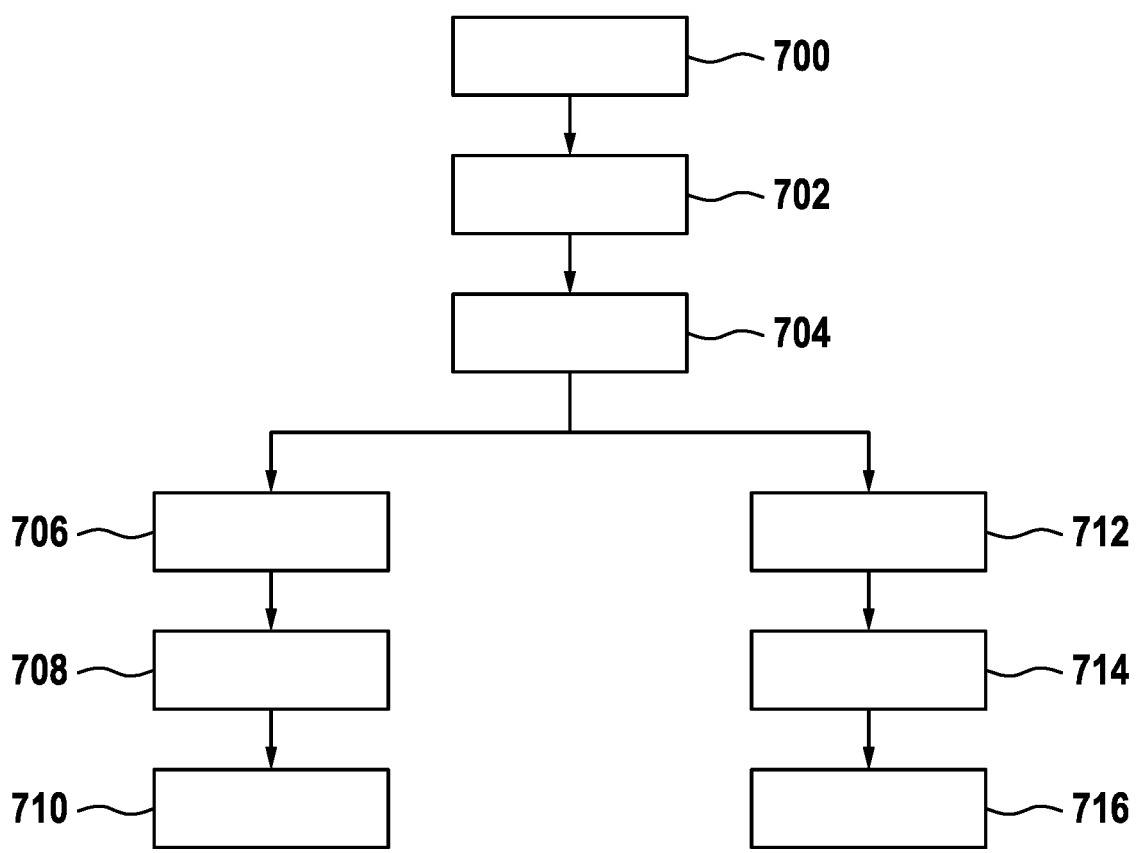
FIG. 7 schematically shows a method according to a further embodiment of the invention in a flow diagram.

FIG. 7 illustrates a method according to a further embodiment of the invention by means of a flow diagram. Such method can be performed, for example, using a microtome system 100, 200 or 300 as illustrated in FIGS. 1 to 3 and described above.

In a step 700, the knife 112 can be arranged at or in the knife holder 110 and the specimen 122 can be arranged at or in the specimen holder 120. In a step 702, a light gap is generated between the front face 124 of the specimen 122 and the knife edge 114. This can be performed using and/or controlling the illumination 230. In a step 704, at least one geometric feature of the light gap 236 is detected by means of the detector 240 (or its camera). Such geometric features can be, for example, the width W or the angle γ mentioned above.

In a step 706, the knife edge 114 is aligned automatically with the front face 124 of the specimen 122 by controlling, with the controller 250, the first actor 260.1 depending on the detected at least one geometric feature of the light gap. This can comprise controlling the first actor 260.1 such that the knife edge 114 is arranged parallel to the front face 124 as explained above, in particular, with respect to FIG. 4A.

In an embodiment, in a step 708, the front face 124 of the specimen 122 is arranged parallel to the cutting direction c by controlling, with the controller 250, the second actor 260.2. This can comprise controlling the second actor 260.2 such that the width W remains constant during relative movement in the cutting direction c between the knife edge 114 and the specimen 122 as explained above, in particular, with respect to FIG. 4B.

In an embodiment, in a step 710, the upper edge and/or the lower edge of the front face 124 of the specimen is arranged parallel to the knife edge 114 by controlling, with the controller 250, the third actor 260.3. This can comprise controlling the third actor 260.3 such that during relative movement in the cutting direction c between the knife edge 114 and the specimen 122 when held by the specimen holder 120, the at least one geometric feature of the detected light gap 236 comprises a dimension, e.g., width W, that remains constant along the length L of the light gap 236 over a predetermined upper region up to the upper edge of the front face 124 of the specimen 122 and then decreases evenly along the length L of the light gap 236. Alternatively, or additionally, the dimension, e.g., the width W, remains constant along the length L of the light gap 236 over a predetermined lower region down to the lower edge of the front face 124 of the specimen 122 and then decreases evenly along the length L of the light gap 236.

In an embodiment, a step 712 can be performed in addition to or alternatively to step 706. In step 712, indications are provided to a user depending on the detected at least one geometric feature of the light gap 236 on how to manually control the first actor in order to align the knife edge 114 with the front face 124 of the specimen 122. Such indications might be instructions in text form and/or graphics like assistances lines on a display. Based on such indications, the user can then operate the first actor (it might be motorized but does not need to be in this embodiment) in order to achieve that the knife edge 114 is aligned with the front face 124 of the specimen 122.

Similar to step 708, in a step 714, indications might be provided to the user, depending on the detected at least one geometric feature of the light gap, on how to manually control the second actor in order to arrange the front face 124 of the specimen 122 parallel to the cutting direction c.

Similar to step 710, in a step 716, indications might be provided to the user, depending on the detected at least one geometric feature of the light gap, on how to manually control the third actor in order to arrange the upper edge and/or the lower edge of the front face 124 of the specimen parallel to the knife edge 114.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Some embodiments relate to a microtome system comprising a controller as described in connection with one or more of the FIGS. 1 to 3. Alternatively, a microscope may be part of or connected to a system as described in connection with one or more of the FIGS. 1 to 3. FIG. 3 shows a schematic illustration of a microtome system 300 configured to perform a method described herein. The microtome system 300 comprises a detector 240 and a computer system or controller 250. The detector 240 is configured to take images and is connected to the computer system 250. The computer system 250 is configured to execute at least a part of a method described herein. The computer system 250 may be configured to execute a machine learning algorithm. The computer system 250 and detector 240 may be separate entities but can also be integrated together in one common housing. The computer system 250 may be part of a central processing system of the detector 240 and/or the computer system 250 may be part of a subcomponent of the detector 240, such as a sensor, an actor, a camera or an illumination unit, etc. of the detector 240.

The computer system 250 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 250 may comprise any circuit or combination of circuits. In one embodiment, the computer system 250 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 250 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system 250 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system 25 may also include a display device, one or more speakers, and a keyboard and/or controller, which can include a mouse, trackball, touch screen, voice-recognition device, or any other device that permits a system user to input information into and receive information from the computer system 250.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 100, 200, 300 microtome system
110 knife holder
112 knife
112' mirrored knife
114 knife edge
114' mirrored knife edge
116 collecting box
120 specimen holder
122 specimen
124 front face of specimen
218 side surface of knife
230 illumination
232 light source
234 diffusion element
235 gap
236 light gap
238 light beam
238.1 light ray
240 detector
250 controller
260.1 first actor
260.2 second actor
260.3 third actor
262 hand wheel 302 housing
370 display
372 microscope
374 indications to user
424.1 upper edge of front surface of specimen
424.2 lower edge of front surface of specimen
436.1, 436.2 edges of light gap
580.1, 580.2, 580.3 images
582 pixel
700-716 method steps
x, y, z, z' axis
b feed direction
c cutting direction
d width of gap
W width of light gap
W11, W12, W13, W21, W22, W23 values of width W
L length of light gap
α angle of rotation about axis z'
α' value of angle α
β angle of rotation about axis x
β' value of angle β
φ angle between edges of light gap
φ1, φ2, φ3, φ4, φ5 values of angle φ

The invention claimed is:

1. A microtome system for cutting sections from a specimen, the microtome system comprising:
a knife comprising a knife edge configured to cut a section from the specimen,
a knife holder holding the knife,
a specimen holder configured to hold the specimen,
an illumination,
a first actor,
a detector, and
a controller;
wherein the knife holder and the specimen holder are configured to be moveable relative to one another in a cutting direction,
wherein the knife holder or the specimen holder is mounted rotatably about a first axis,
wherein the first actor is configured to cause a rotation of the knife holder or the specimen holder about the first axis,
wherein the illumination is configured to illuminate a gap between a front face of the specimen when held by the specimen holder and the knife edge, in order to generate a light gap,
wherein the detector is configured to detect at least one geometric feature of the light gap, and
wherein the controller is configured to:
a) automatically align the knife edge with the front face of the specimen by controlling the first actor depending on the detected at least one geometric feature of the light gap, and/or
b) provide indications to a user, depending on the detected at least one geometric feature of the light gap, on how to manually control the first actor in order to align the knife edge with the front face of the specimen.

2. The microtome system according to claim 1, wherein the controller is configured to control the first actor for arranging the knife edge parallel to the front face of the specimen such that the at least one geometric feature of the detected light gap comprises a constant width along a light gap length.

3. The microtome system according to claim 1, wherein the knife holder is mounted rotatably about the first axis, and wherein the cutting direction is parallel to the first axis.

4. The microtome system according to claim 1, further comprising a second actor,
wherein the knife holder or the specimen holder is mounted rotatably about a second axis,
wherein the second actor is configured to cause a rotation of the knife holder or the specimen holder about the second axis, and
wherein the controller is configured to control the second actor such that the front face of the specimen is arranged parallel to the cutting direction.

5. The microtome system according to claim 4, wherein the controller is configured to control the second actor for arranging the front face of the specimen parallel to the cutting direction such that the at least one geometric feature of the detected light gap comprises a dimension that remains constant during relative movement in the cutting direction between the knife edge and the specimen when held by the specimen holder.

6. The microtome system according to claim 4, wherein the specimen holder is mounted rotatably about the second axis.

7. The microtome system according to claim 1, further comprising a third actor,
wherein the knife holder or the specimen holder is mounted rotatably about a third axis, wherein a feed direction of the specimen holder with respect to the knife holder is parallel to the third axis,
wherein the third actor is configured to cause a rotation of the knife holder or the specimen holder about the third axis, and
wherein the controller is configured to control the third actor such that the upper edge and/or the lower edge of the front face of the specimen is arranged parallel to the knife edge.

8. The microtome system according to claim 7, wherein the controller is configured to control the third actor for arranging the upper edge and/or the lower edge of the front face of the specimen parallel to the knife edge such that, during relative movement in the cutting direction between the knife edge and the specimen when held by the specimen holder, the at least one geometric feature of the detected light gap comprises a dimension that remains constant along the length of the light gap over a predetermined upper region up to the upper edge of the front face of the specimen and then decreases evenly along the length of the light gap and/or over a predetermined lower region down to the lower edge of the front face of the specimen and then decreases evenly along the length of the light gap.

9. The microtome system according to claim 7, wherein the specimen holder is rotatable about the third axis.

10. The microtome system according to claim 1, wherein the detector comprises a digital camera configured to image the light gap.

11. The microtome system according to claim 10, wherein a value of the at least one geometric feature of the light gap is detected by the camera based on a plurality of images acquired at the same relative positions between the knife holder and the sample holder.

12. The microtome system according to claim 1, wherein the detector is configured to detect a plurality of values for the at least one geometric feature of the light gap for a plurality of different relative positions between the sample holder and the knife holder, and
wherein the controller is configured to, based on the plurality of values for the at least one detected geometric feature:

a) automatically align the knife edge with the front face of the specimen, and/or
b) provide the indications to the user.

13. A method for aligning a knife edge of a knife with a front face of a specimen for cutting sections from the specimen, wherein the knife is held by a knife holder, wherein the specimen is held by a specimen holder, wherein the knife holder or the specimen holder is mounted rotatably about a first axis, and wherein a first actor is configured to cause a rotation of the knife holder or the specimen holder about the first axis, the method comprising:
   illuminating, by an illumination, a gap between a front face of the specimen and the knife edge, in order to generate a light gap;
   detecting, by a detector, at least one geometric feature of the light gap; and
   a) automatically aligning the knife edge with the front face of the specimen by controlling, with a controller, the first actor depending on the detected at least one geometric feature of the light gap, and/or
   b) providing indications to a user, depending on the detected at least one geometric feature of the light gap, on how to manually control the first actor in order to align the knife edge with the front face of the specimen.

14. A tangible, non-transitory computer-readable medium having processor-executable instructions stored thereon, which, upon being executed, provide for performance of a method comprising:
   receiving, from a detector, at least one geometric feature of a light gap, wherein the light gap has been generated, by an illumination, illuminating a gap between a front face of a specimen and a knife edge, and
   a) generating instructions for controlling a first actor for automatically aligning the knife edge with the front face of the specimen depending on the at least one geometric feature of the light gap received from the detector, and/or
   b) generating and providing indications to a user, depending on the at least one geometric feature of the light gap received from the detector, on how to manually control the first actor in order to align the knife edge with the front face of the specimen.

* * * * *